United States Patent [19]

Foran et al.

[11] Patent Number: 5,393,336

[45] Date of Patent: Feb. 28, 1995

[54] WATER RESISTANT HIGH AMYLOSE CORRUGATING ADHESIVE WITH IMPROVED RUNNABILITY

[75] Inventors: Michael T. Foran, Somerville; Craig H. Leake, Edison; Michael T. Philbin, Somerville; Peter T. Trzasko, Plainsboro, all of N.J.

[73] Assignee: National Starch and Chemical Investment Holding Corporation, Wilmington, Del.

[21] Appl. No.: 69,886

[22] Filed: Jun. 1, 1993

[51] Int. Cl.⁶ ............... C09J 103/04; C09J 103/10
[52] U.S. Cl. .................................................. 106/213
[58] Field of Search ......................................... 106/213

[56] References Cited

U.S. PATENT DOCUMENTS

| | | | |
|---|---|---|---|
| 3,284,381 | 11/1966 | Hickey et al. | 260/17.3 |
| 3,532,648 | 10/1970 | Wilhelm | 260/17.2 |
| 4,297,144 | 10/1981 | Klein et al. | 106/197 C |
| 4,329,187 | 5/1982 | Chiu et al. | 106/213 |
| 4,400,480 | 8/1983 | Silano et al. | 524/47 |
| 4,775,706 | 10/1988 | Iovine et al. | 524/47 |
| 4,787,937 | 11/1988 | Leake | 106/213 |
| 4,912,209 | 3/1990 | Leake et al. | 536/102 |

FOREIGN PATENT DOCUMENTS 60-23466  2/1985  Japan .

OTHER PUBLICATIONS

R. H. Williams et al., Influences of Carrier Starch on Green Bond Strength Corrugating Adhesives, Tappi, vol. 60. No. 4 (1977) pp. 86–89.

*Primary Examiner*—David Brunsman
*Attorney, Agent, or Firm*—Eugene Zagarella, Jr.

[57] ABSTRACT

A water resistant, starch-based, alkaline corrugating adhesive is provided having improved tack or runnability and comprises using a chemically treated or modified high amylose starch having at least 40% by weight amylose content as the raw starch component.

18 Claims, No Drawings

WATER RESISTANT HIGH AMYLOSE CORRUGATING ADHESIVE WITH IMPROVED RUNNABILITY

BACKGROUND OF THE INVENTION

This invention relates to a high amylose starch-based, water resistant, alkaline corrugating adhesive with improved runnability or tack. More particularly, this invention is directed to chemically treated high amylose raw starch which is useful in alkaline corrugating adhesives and provides high levels of water resistance while being operable at high corrugator running speeds.

The term "corrugated paperboard" as used herein refers to a fluted medium and a facing adhesively joined to the tips on one or both sides of the fluted medium. The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard in which an inner fluted layer sandwiched between two facings is desired, a second operation is performed wherein the adhesive is applied to the exposed tips of the single-faced board and the adhesive-coated tips are then pressed against a second facing in the combining section of the corrugator under the influence of pressure and heat. The typical corrugating process and the operation and use of corrugators in general are described in U.S. Pat. Nos. 2,051,025 and 2,102,937 issued on Aug. 18, 1936 and Dec. 21, 1937 respectively to Bauer.

A major concern in such processes is the selection of the appropriate adhesive, as its properties will affect not only the strength and stability of the final corrugated product, but also the parameters, such as corrugator speed, within which the process can be operated. Thus, such adhesives are chosen in light of the specific requirements of the process and the properties desired in the ultimate corrugated paperboard. The adhesives most commonly used in corrugating are starch-based adhesives which are popular because of their desirable adhesive properties, low cost and ease of preparation.

The most fundamental of starch corrugating adhesives is an alkaline adhesive which is comprised of ungelatinized raw starch suspended in an aqueous dispersion of cooked starch (carrier). The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and tack and formation of the adhesive bond.

It is often desired or necessary in the manufacture of corrugated paperboard that the adhesive yield water resistant bonds which can withstand extended exposure to high humidity, water, melting ice and the like. A number of approaches have been devised to produce water resistant corrugating adhesives. One method involves preparation of an acidic, starch-based adhesive wherein urea-formaldehyde together with an acidic catalyst is added to the composition to produce water resistant bonds in corrugated board. Another more commonly followed method involves the use of alkaline curing starch-based adhesive wherein thermosetting resin such as urea-formaldehyde, ketone-formaldehyde or resorcinol-formaldehyde are added as crosslinking additives to produce water resistant bonds.

In recent years, due to the uncertainty of the safety of formaldehyde, efforts have been made to reduce the levels of exposure to formaldehyde or even better, to provide a formaldehyde-free alkaline starch-based adhesive composition which is useful in the manufacture of corrugated paperboard.

While water resistance is an important factor to be considered in formulating a corrugating adhesive, another property which must be considered and is directly related to the utility of the formulation is its ability to rapidly form an initial bond, termed "tack" or "green bond strength". This rate of tack development is directly related to the speed at which the corrugator can be run, i.e., runnability, and consequently there exists a need for corrugating adhesives possessing high green bond strengths and rapid development of tack.

While there are different theories regarding the respective roles of the raw starch and the carrier in the development of adhesive properties, some research has centered on the view that the carrier contributes to the bond strength and setting speed of the adhesive. Indeed, it has been suggested that good tack in the carrier leads to good tack (and therefore improved runnability) in the adhesive (see e.g., R. Williams, C. Leake and M. Silano, TAPPI, Vol. 60, No. 4, Apr. 1977, pp. 86-89). Further, it has been known for many years that a corrugating adhesive whose carrier portion is prepared from a high amylose starch exhibits superior tack to one prepared from pearl starch, which contains about 27% amylose, because the high amylose carrier will have improved theological and film-forming properties, and also increased moisture resistance particularly when used with chemical crosslinkers. Consequently, there are many different carriers available for use in starch-based adhesives.

To date, however, relatively little experimentation has been done with the raw (uncooked or ungelatinized) starch portion of the adhesive, other than varying the species of starch source utilized. While high amylose starch, as noted above, has been used in the carrier portion of the adhesive to provide improved water resistance and tack, it has not been found to be useful in the raw starch because of its added expense and more significantly, because it does not provide the level of tack or runnability desired. This is noted in U.S. Pat. No. 3,532,648 issued on Oct. 6, 1970 where it is disclosed that by varying the secondary (unpasted) starch (i.e., ungelatinized or raw starch) employed, the properties of the adhesive can advantageously be tailored to the particular corrugated-based production requirements. The patent then discloses that when an amylose component (at least 35% by weight) is added to a given formulation to provide at least a portion of the secondary starch (raw starch), the waterproofness of the adhesive is improved but such improvement is accompanied by a decrease in the machine speed of the adhesive, depending on how much amylose component is used.

Accordingly, the need still exists for a formaldehyde-free alkaline starch-based adhesive that has good water resistance properties and also has an improved and satisfactory degree of tack or runnability that will make it particularly useful in corrugating paperboard manufacturing operations.

SUMMARY OF THE INVENTION

It has now been found that a starch-based, water resistant alkaline corrugating adhesive free of formaldehyde and other crosslinking additives and having improved tack or green bond strength is obtained when a chemically treated or modified high amylose starch is used as the ungelatinized raw starch component. This high amylose containing adhesive has high levels of water resistance and improved runnability making it especially useful in high speed corrugator operations.

More particularly, this invention is directed to a starch-based alkaline corrugating adhesive comprising an aqueous dispersion of a cooked or gelatinized starch and a raw starch which is a chemically treated or modified high amylose starch, i.e., at least 40% by weight amylose content. This corrugating adhesive, which has good water resistance and improved runnability or tack as evidenced by its green bond strength, results from the use of high amylose raw starch which has been mildly treated or modified by oxidation, hydrolysis, esterification, etherification, crosslinking, and alkali or solvent treatment.

DETAILED DESCRIPTION OF THE INVENTION

The alkaline corrugating adhesive composition of this invention comprises an ungelatinized raw starch, a cooked carrier starch, an alkali base material and water.

The ungelatinized raw starch component utilized in this invention is comprised in whole or in part by a chemically treated or modified high amylose starch containing at least 40% and preferably at least 50% by weight of amylose content.

As previously noted, the use of high amylose starch as the raw component of corrugating adhesives has not provided the level of tack or runnability desired. While not wishing to be bound by theory, it is believed that chemical treatment or modification of high amylose starch as described herein, has in some way weakened or disrupted the granular structure of the starch and/or increased the ability of the granule to swell and absorb water. This in turn results in an adhesive having an increased rate of tack development and green bond strength and provides improved runnability and the ability to operate at higher corrugator speeds with no reduction in water resistance.

The chemical treatment or modification of the higher amylose starch to weaken or disrupt the granular structure involves one or more operations including oxidation, hydrolysis, esterification, etherification, crosslinking, and alkali or solvent treatment. While each of these steps have been utilized in the treatment of various starches, it is important that the chemical treatment or modification of high amylose starch as used herein only involves a mild or low treatment level or degree of application. This allows the high amylose starch to satisfactorily perform as the raw starch component in a corrugating adhesive while providing good water resistance and improved tack or runnability properties. Furthermore, and significantly, it eliminates the use of formaldehyde or other chemical additives needed to provide water resistance.

Oxidation using alkaline hypochlorite and more particularly sodium hypochlorite is a preferred treatment for the high amylose starch. This is carried out using a light oxidation of 0.1 to 1.5, more preferably 0.2 to 1.2% by weight available chlorine under alkaline conditions, pH of 7.5 to 12. While hypochlorite is a preferred and well known oxidizing agent, other known oxidants such as hydrogen peroxide, persulfate, peracetic acid and permanganate as well as combinations of permanganate and hydrogen peroxide as disclosed in U.S. Pat. No. 4,838,944 issued on Jun. 13, 1988 to L. Kruger may be used.

Hydrolysis by acid treatment with e.g. concentrated HCl at 0.1 to 1% by weight is also useful in the chemical treatment or modification of high amylose starch. Besides hydrochloric acid, other acids and particularly mineral acids such as sulfuric acid and phosphoric acid may also be used.

Treatment of starch under alkaline conditions is also useful in the chemical treatment and modification of high amylose starch. Sodium hydroxide, at 2 to 4% by weight treatment, is a preferred alkaline material but alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate may also be used.

Another treatment technique for disrupting the amylose granular structure involves the use of solvents such as dimethyl sulfoxide and other polar, aprotic solvents, e.g. N-methyl pyrrolidone and dimethyl formamide, and aliphatic alcohols. Particularly useful is dimethyl sulfoxide diluted with other solvents such as aliphatic alcohols or halogenated hydrocarbons such as chloroform. The solvent is typically added in a sufficient amount, e.g. 1.5 to 15 parts per part by weight of starch and then the mixture is refluxed.

Besides the treatments noted above, chemical modification of the high amylose starch can be made by esterification, etherification or crosslinking using known procedures but at low treatment levels. Esterification, for example, may involve acetylation with acetic anhydride or formation of the half-esters of dicarboxylic acids/anhydrides at 0.5 to 3% by weight treatment levels. Etherification may involve modification with alkylene oxides such as ethylene oxide and propylene oxide or carboxymethylation with e.g., sodium chloroacetate, at treatment levels of 0.5 to 3% by weight. Crosslinking may involve modification, for example, with multifunctional reagents such as epichlorohydrin, phosphorus oxychloride, trimetaphosphates, and dicarboxylic acid anhydrides at treatment levels of 0.005 to 0.1% by weight. The various treatments and modifications as disclosed herein are further described in *Starch:-Chemistry and Technology*, edited by R. L. Whistler, et al., Chapters X and XVII, 1984 and *Modified Starches:-Properties and Uses*, edited by O. B. Wurzburg, Chapters 2-6, 9 and 11, 1986.

While the various treatments of high amylose as described above can be used alone, they may also be combined, such as treatment with dimethyl sulfoxide in combination with hypochlorination in order to obtain desirable properties.

The high amylose starch material used in this invention as the raw starch component and optionally as the carrier component is one containing at least 40% by weight of amylose. It is well known that starch is composed of two fractions, the molecular arrangement of one being linear and the other being branched. The linear fraction is known as amylose and the branched fraction amylopectin. Starches from different sources, e.g. potato, corn, tapioca, and rice, etc., are characterized by different relative proportions of amylose and amylopectin components. Some plant species have been generally developed which are characterized by a large preponderance of one fraction over the other. For instance, certain varieties of corn which normally contain about 22-28% amylose have been developed which yield starch composed of over 40% amylose. These hybrid varieties have been referred to as high amylose or amylomaize.

High amylose corn hybrids were developed in order to naturally provide starches of high amylose content and have been available commercially since about 1963. Suitable high amylose starches useful herein are any starches with an amylose content of at least 40% and preferably at least 50% by weight. While high amylose corn starch has been especially suitable, other starches which are useful include those derived from any plant species which produces or can be made to produce a high amylose content starch, e.g., corn, peas, barley and rice. Additionally, high amylose starch can be obtained by separation or isolation such as the fractionation of a native starch material or by blending isolated amylose with a native starch.

The high amylose starch used in the raw starch component as described herein, may comprise the entire starch portion of that component or it may comprise a blend of 10% or more, preferably 25% or more and more preferably 50% or more by weight of chemically treated or modified high amylose starch with other starches suitable for use in corrugating adhesives. These other starches as well as the starch in the carrier component may be selected from the several starches, native or converted, heretofore employed in starch corrugating adhesive compositions. Suitable starches include, for example, those starches derived from corn, potato, waxy maize, sorghum, wheat and the carrier may also include high amylose starches i.e. having 40% or more by weight of amylose. Modified starches and various derivatives such as ethers, esters, thin-boiling types prepared by known processes such as mild acid treatments, oxidation, etc., and other starches typically employed in corrugating may be used. Other starches which may be used as the carrier starch include the high amylose starches having greater than 60% by weight amylose as disclosed in application docket no. 1458, filed on the same date as this application and entitled "All Natural, Starch-Based, Water Resistant Corrugating Adhesive", which is incorporated herein by reference.

The ratio of raw starch to carrier will vary depending on properties desired and generally will range from about 2:1 to 16:1 by weight depending on the nature of the starch and the viscosity desired. The total amount of starch employed including the gelatinized or cooked carrier and the ungelatinized raw starch will typically be in the range of about 10 to 50% by weight, based on the weight of the composition.

While the corrugating adhesive composition as described herein is primarily directed to the particularly preferred embodiment of a composition comprising a carrier starch and a raw starch, it may also include a no carrier composition having just a single starch component comprising an ungelatinized starch which upon subsequent treatment with alkali becomes partially swollen. This single starch composition will comprise the chemically treated or modified high amylose starch of this invention, optionally with blends of other starches as described herein. The total amount of starch employed in the single starch component composition (no carrier) will range from about 10 to 50% by weight, based on the weight of the composition. Other components including the alkali, boron-containing salt and water will be used in amounts as otherwise described herein.

The adhesive composition also includes an alkali which is used in amounts sufficient to provide the adhesive with a pH greater than 7, more particularly from about 7.5 to 13 and preferably from 10 to 13. Typically this represents an amount of from about 0.3 to 5% and preferably from about 1 to 4% by weight based on the weight of starch.

The alkali (base) employed herein is preferably sodium hydroxide; however, other bases may be used in partial or full replacement of the sodium hydroxide and include, for example, alkali metal hydroxides such as potassium hydroxide, alkaline earth hydroxides such as calcium hydroxide, alkaline earth oxides such as barium oxides, alkali metal carbonates such as sodium carbonate, and alkali metal silicates such as sodium silicate. The alkali may be employed in aqueous or solid form.

Another common ingredient of corrugating adhesives is a boron-containing salt, e.g., borax which is useful as a tackifier and which is optionally used in amounts of up to about 5% by weight, based on the total weight of starch. Additionally, any conventional non-chemically functional additives may be incorporated into the adhesive in minor amounts, if desired. Such additives include, for example, preservatives; defoamers; wetting agents; plasticizers; solubilizing agents; rheology modifiers; water conditioners; penetration control agents; peptizers such as urea; gelatinization temperature modifiers; inert fillers such as clay and finely ground polymers; thickeners such as inorganic colloidal clays, guar, hydroxyethyl cellulose, alginates, polyvinyl alcohol, polymers of ethylene oxide and the like; colorants; and emulsions such as polyvinyl acetate.

The remainder or balance of the adhesive composition will be water in an amount of from about 40 to 90% and preferably about 50 to 80% by weight, based on the total weight of the adhesives.

In the preparation of the corrugating adhesives herein, the method used by the practitioner can vary without serious consequences. Ordinarily, however, the carrier starch is first gelatinized (cooked) in a portion of the water with the alkali (caustic soda) to provide the carrier component of the adhesive. In a separate vessel, a mixture or slurry is made of the raw starch, borax (optional) and remaining water. The carrier and raw starch mixture are combined to form the final adhesive. Optional ingredients, if desired, can be added at any convenient point during the preparation of either component but are usually added to the finished adhesive.

The adhesives herein can be used to bond single- or double-faced boards using any equipment which is presently employed for the preparation of corrugated board. Thus, the adhesive is usually maintained at a temperature of between 20° and 55° C. before its application to the protruding tips of the fluted paper strip. The actual application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well know in the art. A double-faced board may be subsequently prepared by bringing a second facing in contact with the open fluted surface of the single-faced board by the usual procedures.

Any of the various paperboard substrates may be utilized in combination with the adhesive composition of the present invention in order to provide corrugated paperboard. As the corrugating adhesive of the present invention provides water resistant properties, it is usually desirable to utilize a water resistant paperboard in combination with the adhesive in order to provide a water resistant corrugated paperboard product. One preferred paperboard product is a wax impregnated paperboard, however, any of the various water resistant paperboard products such as, e.g., resin impregnated paperboard, may be utilized in combination with the water resistant adhesive of the present invention.

In the following examples, which are merely illustrative of the various embodiments of this invention, all parts and percentages are given by weight and all temperatures are in degrees Celsius unless otherwise noted.

The following test procedures were used to evaluate the various adhesives and starches herein used in preparing corrugated board.

BRABENDER PEAK VISCOSITY

A Brabender alkaline solution containing 0.86% sodium hydroxide and 0.74% 10 mole borax was used to slurry the starch sample. A 350 cmg sensitivity cartridge was used. To a 32 g anhydrous sample of starch was added the caustic/borax Brabender solution to a total charge weight of 460 g. The mixture was slurried and placed in a Brabender cup and the sample heated to 30° C. and held for five minutes, then heated at 1.5° C./minute to 90° C. The peak viscosity in Brabender units (B. U.) was observed for each sample.

TACK TEST

Samples of adhesive were examined for tack development and green bond strength in the joining of a 62 lb/MSF (1000 square fee) wet strength corrugating liner to a 33 lb/MSF wet strength corrugating medium.

The adhesive was applied to the corrugating liner using a 10 mil Bird applicator. Subsequently, a sheet of corrugating medium was placed atop a hot plate at 350° F. (177° C.) under a 5 g/cm$^2$ weight for 5 seconds. Immediately thereafter, one end of the liner was attached to a dial-type spring scale. The medium was then manually separated from the liner in a continuous fashion and the force required to achieve such separation was periodically recorded. This force is a measure of the green bond strength and the rate of tack development with time and is related to the speed at which a corrugator can be run, i.e., the higher the green bond strength and the faster tack is developed, the faster the corrugator can be run.

WATER RESISTANT PROPERTIES

Sample adhesives were evaluated for the water resistant properties of bonds formed on double-faced corrugated paperboard using the following method which simulates conditions of the double-back section of a corrugator.

The adhesive sample was applied at 3 mil thickness with a Bird applicator to a glass plate and was transferred to sheets of a single-face web of 62 lb/1000 ft$^2$(0.302 kg/m$^2$) wet strength liner and 33 lb/1000 ft$^2$(0.147 kg/m$^2$) wet strength medium by means of direct hand pressure. The single-face samples were then placed on top of another sample of the wet strength liner and the resultant double-faced board was bonded at 0.25 psi on a hot plate at 177° C. for 5 seconds. The bonded boards were then placed in a conditioning atmosphere of 22° C., 50% relative humidity for 24 hours, after which dry 2×4 inch samples and additional 2×4 inch samples of the boards placed in water at 22° C. for 24 hours were tested as described below.

The sample boards were evaluated for dry pin adhesion and wet pin adhesion using the tests described in TAPPI Standard T 821 OM-87 using a Hinde and Dauch Crush Tester obtainable from Testing Machines Inc., Mineola, N.Y. The test results were recorded in pounds (per 8 square inches) required to separate completely the double-face liner from the single face web. The results are the average of six replicate trials.

STEIN-HALL VISCOSITY

Viscosities were determined using a conventional Stein-Hall cup and measuring the time in seconds, required for 100 ml of the adhesive composition to pass through an orifice having a diameter of 3/32 inch.

BROOKFIELD VISCOSITY

Viscosities were determined using a Brookfield Viscometer (model RVT) at 20 rpm and 100° F.

EXAMPLE 1

Preparation of Adhesive

All samples of corrugating adhesive were prepared in essentially the same manner, differing only in the precise starches employed and the ratios of components. A representative preparation is presented below.

A carrier component was prepared by cooking at 60° C. (140° F.) 65.3 g of high amylose corn starch (70% amylose) in 132 g of water. A total of 5.1 g of sodium hydroxide (dissolved in 13.2 g of water) was then added and the system was agitated for 10 to 20 minutes. Then, 132.0 g of water was added to cool the system and quench the reaction.

The raw starch component was prepared in a separate vessel by combining 221.6 g of selected treated or other starch with 429.1 g of water at about 30° C. (90° F.) and adding 3.8 g of borax (pentahydrate) to provide a slurry which was agitated for five minutes. The carrier component was then slowly added and additional water added, if desired, to adjust viscosity. The prepared adhesive was subsequently used in the different test procedures.

EXAMPLE 2

To a slurry of 1 kg of a high amylose corn starch material, (−50% amylose) in 1.5 l of water at 30° C., enough 3% NaOH was added to raise the pH to 10.8.

Sufficient sodium hypochlorite (NaOCl) at 4.84% available $Cl_2$ was added to provide solutions at treatment levels of 0.2, 0.4, 0.6, 0.82 and 1.2% available $Cl_2$ respectively. Each solution slurry was stirred for 18 hours while the pH was maintained above 10.8 by addition of 3% NaOH. Excess sodium hypochlorite was neutralized with 10% sodium bisulfite. The pH was adjusted to 6.0 with HCl, the slurry filtered and washed three times with 1.5 l of water. The alkaline Brabender peak viscosity for each solution was determined and the results noted as follows:

| NaOCl treatment level (% available $Cl_2$) | Alkaline Brabender Peak Viscosity |
|---|---|
| 0.0 | 1500 B.U. |
| 0.2 | 2710 B.U. |
| 0.4 | 2900 B.U. |
| 0.6 | 2590 B.U. |
| 0.82 | 2000 B.U. |
| 1.2 | 1545 B.U. |

Samples of each treated solution were then used as the treated high amylose raw starch component in a corrugating adhesive prepared in accordance with Example 1.

TABLE 1

| RAW STARCH WITH NaOCl TREATED HIGH AMYLOSE (50% AMYLOSE) (% AVAILABLE $Cl_2$) | % STARCH IN WATER | STEIN HALL VISCOSITY (sec.) | BROOKFIELD VISCOSITY 20 rpm @100° F. | GEL TEMPER- ATURE (°F.) | DRY PIN (lb) | WET PIN (lb) | TACK DEVELOPMENT measured in grams over time | | | | |
|---|---|---|---|---|---|---|---|---|---|---|---|
| | | | | | | | 5 sec | 10 sec | 15 sec | 20 sec | 25 sec |
| Untreated | 28.5% | 81 | 4050 | 154 | 118 | 17.1 | 175 | 200 | 200 | 225 | 250 |
| 0.2% | 27.8% | 137 | 3700 | 155 | 129 | 16.3 | 300 | 350 | 400 | 700 | 900 |
| 0.4% | 28.1% | 81 | 3500 | 154 | 116 | 15.8 | 250 | 375 | 375 | 650 | 975 |
| 0.6% | 27.8% | 75 | 2920 | 154 | 123 | 18.8 | 200 | 250 | 350 | 625 | 850 |
| 0.82% | 28.5% | 93 | 3550 | 156 | 133 | 18.9 | 275 | 325 | 475 | 650 | 925 |
| 1.2% | 27.8% | 130 | 3720 | 152 | 120 | 17.7 | 300 | 325 | 500 | 625 | 800 |

The adhesive samples were then tested for various properties which are shown in Table 1 along with a comparative sample which used untreated high amylose starch (50% amylose) as the raw component. The results illustrate the improvement in runnability as shown by the tack development test of corrugating adhesives containing the NaOCl treated raw starch over the untreated raw starch.

Additional corrugating test adhesives containing other treated high amylose raw starch components are shown below.

EXAMPLE 3

Alkaline Treatment of High Amylose Raw Starch

To a slurry of 1 kg of high amylose corn starch (50% amylose) in 1.5 l of water, enough 3% NaOH was added to raise the pH to 11.5. The slurry was stirred for 18 hours at 45° C. and then filtered and washed twice with 1.5 l of pH 11.5 water. The alkaline Brabender peak viscosity was determined to be 1860 Brabender units (B.U.). The solution was then used as the treated high amylose raw starch component in a corrugating adhesive prepared in accordance with Example 1 and the adhesive tested for various properties as shown in Table 2.

EXAMPLE 4

Acid Treatment of High Amylose Raw Starch

To a stirred slurry of 1 kg of high amylose corn starch (50% amylose) in 1.5 l of water at 52° C., 5.0 g of concentrated hydrochloric acid (0.5% treatment) was added and the slurry stirred for 18 hours. The slurry was then neutralized by slowly adding sodium carbonate to raise the pH to 4.5 and then 3% NaOH was added to bring the pH up to 5.5. The slurry was filtered and washed with 1.5 l of water. The alkaline Brabender viscosity was determined to be 1260 Brabender units The treated solution was then used as the raw starch component in a corrugating adhesive prepared in accordance with Example 1 and the adhesive tested for various properties as shown in Table 2.

EXAMPLE 5

Hydroxypropylation of High Amylose Raw Starch

To a stirred slurry of 15 g NaOH, 90 g of sodium sulfate and 1 kg of high amylose corn starch (50% amylose) in 1.5 l of water, 5.0 g of propylene oxide (0.5% treatment) was added. The slurry was sealed and placed in a tumbler at 40° C. for 18 hours. The pH was adjusted to 5.5 with 17.5% nitric acid and the slurry filtered and washed three times with 1.5 l of water. The alkaline Brabender peak viscosity was determined to be 1800 B.U. The solution was used as the treated high amylose raw starch component in a corrugating adhesive prepared as in Example 1 and then tested for various properties as shown in Table 2.

EXAMPLE 6

Acetylation of High Amylose Raw Starch

To a stirred slurry of 1 kg of high amylose corn starch (50% amylose) in 1.5 l water at pH 8 and room temperature, 20.g of acetic anhydride (2% treatment) was added dropwise. The pH was controlled at 8 by addition of 3.0% NaOH and the slurry was then stirred for an additional 30 minutes at room temperature. The pH was adjusted to 5.5 with 9.25% HCl and the slurry was filtered and washed three times with water. The alkaline Brabender peak viscosity was 1800 B.U. This treated starch was used as the raw starch component in a corrugating adhesive prepared as in Example 1 and tested for various properties with results shown in Table 2.

EXAMPLE 7

Carboxymethylation of High Amylose Raw Starch

To a stirred slurry of 1 kg of high amylose corn starch (50% amylose) and 3.95 g of NaOH in 2 l of 95% isopropanol/water, 10 g of sodium chloroacetate (1% treatment) was added. The slurry was stirred at 50° C. for 18 hours, then neutralized by addition of 5.93 g of acetic acid. The slurry was filtered and washed three times with 1.5 l of water. Alkaline Brabender peak viscosity was 2020 B.U. The treated starch was used as the raw starch component of a corrugating adhesive as in Example 1 and the adhesive tested for various properties shown in Table 2.

EXAMPLE 8

DMSO Treatment of High Amylose Raw Starch

A mixture of 1 kg of high amylose corn starch (50% amylose) and 2.5 l of 60:40 methanol/dimethyl sulfoxide (DMSO) was refluxed for 0.5 hours. The mixture was filtered hot and washed twice with 2 l of methanol followed by 1 l of ethanol. The starch had a fat content reduced from 0.85% to 0.06% and an alkaline Brabender peak viscosity of 1900 B.U. The treated starch was used as the raw starch component of a corrugating adhesive prepared as Example 1 and the adhesive was tested for various properties shown in Table 2.

EXAMPLE 9

A sample of DMSO treated starch solution prepared in Example 8 was further treated with sodium hypochlorite (NaOCl) by stirring 3 kg of the DMSO treated starch in 4.5 l of water at 30° C. and adding 3% NaOH to raise the pH to 10.8. To the slurry was added 555.1 g of sodium hypochlorite at 4.43% available $Cl_2$ to provide a treatment level of 0.82% available $Cl_2$. The slurry was stirred for 18 hours while the pH was kept above 10.8 by addition of 3% NaOH. Excess sodium hypochlorite was neutralized with 10% sodium bisulfite. The pH was adjusted to 6.0 with 9.25% HCl, the slurry filtered and washed three times with 4.5 l of water. The alkaline Brabender peak viscosity was 3000 B. U. and the treated starch was used as the raw starch component of a corrugating adhesive as in Example 1 and tested for various properties shown in Table 2.

EXAMPLE 10

To a stirred slurry of 4 g of NaOH and 500 g of high amylose corn starch (50% amylose) in 750 ml of water, 0.04 g of epichlorohydrin (0.008% treatment) was added. The slurry was sealed and placed in a tumbler at 40° C. for 18 hours. The pH was adjusted to 5.5 with 9.25% HCl and the slurry filtered and washed three times with 750 ml of water. The alkaline Brabender viscosity was determined to be 2980 B.U. This treated starch was used as the raw starch component in a corrugating adhesive prepared as in Example 1 and tested for various properties with results shown in Table 2.

It will be noted that the test results shown in Table 2 particularly illustrate the improved runnability of the different treated high amylose starch raw components used in a corrugating adhesive, as evidenced by tack development (green bond strength), as compared to use of an untreated high amylose starch.

TABLE 2

| RAW STARCH[1] TREATMENT | % STARCH IN WATER | STEIN HALL VISCOSITY (sec.) | BROOKFIELD VISCOSITY 20 rpm @100° F. (cps) | GEL TEMPERATURE (°F.) | DRY PIN (lb) | WET PIN (lb) | TACK DEVELOPMENT measured in grams over time | | | | |
|---|---|---|---|---|---|---|---|---|---|---|---|
| | | | | | | | 5 sec | 10 sec | 15 sec | 20 sec | 25 sec |
| Untreated | 28.5 | 81 | 4050 | 154 | 118 | 17.1 | 175 | 200 | 200 | 225 | 250 |
| Alkali (NaOH) treated | 27.8 | 82 | 3820 | 157 | 117 | 14.4 | 275 | 315 | 400 | 425 | 500 |
| Acid (HCl) Treated | 28.5 | 86 | 4000 | 156 | 124 | 18.8 | 300 | 450 | 450 | 500 | 575 |
| Hydroxypropylated | 27.8 | 66 | 2860 | 156 | 126 | 15.7 | 175 | 200 | 250 | 375 | 450 |
| Acetylated Starch Ether | 27.8 | 73 | 3250 | 163 | 122 | 17.1 | 250 | 275 | 325 | 370 | 425 |
| Carboxymethylated Starch Ester | 28.5 | 111 | 4120 | 150 | 123 | 16.4 | 200 | 350 | 450 | 500 | 500 |
| DMSO/MeOH treated | 27.8 | 66 | 3900 | 151 | 129 | 18.9 | 275 | 400 | 575 | 675 | 700 |
| DMSO/MeOH then 0.82% NaOCl treated | 27.8 | 64 | 3300 | 155 | 143 | 22.0 | 300 | 425 | 525 | 675 | 900 |
| Epichlohydrin Crosslinked | 27.8 | 98 | 3800 | 154 | 121 | 14.6 | 325 | 450 | 800 | 1075 | 1300 |

[1]Raw starch is high amylose corn starch (~50% amylose)

EXAMPLE 11

To further illustrate this invention, corrugating adhesives were prepared using sodium hypochlorite treated high amylose corn starch (50% amylose) and untreated high amylose corn starch (50% amylose) as the raw starch component. These adhesives were used to prepare 200 Test, C-flute board constructed of 42 lb/MSF (1000 sq. ft.) singleface (SF) liner, 26 lb/MSF medium and 42 lb/MSF doubleback (DB) liner (42/26/42 board construction) and the performance results given in Table 3. For further comparison, a standard adhesive containing corn starch as the raw starch, Nabond ® a high amylose based carrier starch (a product of National Starch and Chemical Company) and also containing a water resistance resin additive Dacrez ® 81 (an acetone-formaldehyde condensate product of National Starch and Chemical Company) was also used to prepare the C-flute board described above.

The adhesives were prepared by first forming the carrier component by cooking 200 lbs of high amylose corn starch (70% amylose) in 100 gal. of water at 135° F. A 50% solution of NaOH in water (2.2 gal.) was then added and the system agitated for 5 minutes. Five lbs. of borax (10 m) was added and the system agitated for 20 minutes followed by the addition of 60 gals. of water to cool the system and quench the reaction.

The raw starch component was prepared in a separate vessel by adding 90 gal. of water to the selected raw starch (550 lbs.) at 95° F., and adding 13 lbs. borax (10 m). The carrier compound was then slowly added to form the adhesive. In the case of the Nabond adhesive, 30 lbs. of the water resistance resin (Dacrez 81) was post added to the finished adhesive. The formed adhesives were then used in preparing the 200 test, C-flute board as noted above and the test results given in Table 3.

These results indicate a higher degree of water resistance at the 700 ft/min corrugating speed for the adhesive using the treated raw starch over both the adhesive with untreated raw starch and the control.

TABLE 3

| | | 200 Test C-Flute 42/26/42 Board Construction | | | | | | |
|---|---|---|---|---|---|---|---|---|
| RAW STARCH TREATMENT | % STARCH IN WATER | STEIN HALL VISCOSITY (sec.) | GEL TEMPERATURE (°F.) | CORRUGATING SPEED (ft/min) | WET PIN (lb) | | DRY PIN (lb) | |
| | | | | | SF | DB | SF | DB |
| High amylose Starch (50% amylose) sodium hypochlorite (NaOCl) treated | 26.1 | 38 | 152 | 700 | 5.3 | 8.8 | 100 | 117 |
| High amylose (50% amylose) starch - untreated | 26.1 | 24 | 153 | 700 | 0.0 | 6.3 | 124 | 120 |
| | | | | 400 | 5.7 | 7.5 | 87 | 123 |
| Corn starch - untreated[1] | 23.1 | 35 | 152 | 600 | 2.3 | 5.6 | 84 | 94 |

[1] Included Dacrez 81 a water resistance additive.

What is claimed:

1. In a water resistant alkaline curing corrugating adhesive having improved tack and green bond strength and comprising an aqueous dispersion of a gelatinized carrier and an ungelatinized raw starch component, the improvement comprising using a chemically treated or modified high amylose starch having at least 40% by weight amylose content as the raw starch component.

2. The corrugating adhesive of claim 1 wherein the chemical treatment or modification of the high amylose raw starch component comprises oxidation, hydrolysis, esterification, etherification, crosslinking, and alkali or solvent treatment.

3. The corrugating adhesive of claim 2 wherein the composition contains sufficient alkali to provide a pH of greater than 7.

4. The corrugating adhesive of claim 3 wherein the raw starch component comprises a high amylose starch oxidized by treatment with alkaline hypochlorite.

5. The corrugating adhesive of claim 4 wherein the oxidized starch involves treatment with hypochlorite at 0.1 to 1.5% by weight available chlorine.

6. The corrugating adhesive of claim 4 wherein the high amylose starch is oxidized by treatment with hypochlorite at 0.2 to 1.2% by weight available chloride.

7. The corrugating adhesive of claim 6 wherein the ratio of raw starch to carrier starch in the adhesive is about 2:1 to 16:1 by weight.

8. The corrugating adhesive of claim 1 wherein the raw starch comprises a blend containing 10% or more by weight of high amylose treated or modified starch with other starch materials.

9. The corrugating adhesive of claim 1 wherein the raw starch comprises a blend containing 25% or more by weight of high amylose treated or modified starch with other starch materials.

10. The corrugating adhesive of claim 9 wherein the composition contains sufficient alkali to provide a pH of greater than 7.

11. The corrugating adhesive of claim 10 wherein the raw starch comprises a high amylose starch oxidized by treatment with alkaline hypochlorite at levels of 0.1 to 1.5% by weight available chlorine.

12. The corrugating adhesive of claim 11 wherein the high amylose raw starch contains at least 50% by weight of high amylose content.

13. The corrugating adhesive of claim 1 wherein the carrier component comprises a high amylose starch having 40% or more by weight of amylose content.

14. A starch-based, water resistant alkaline curing corrugating adhesive comprising:
   a) from about 10 to 50% by weight, based on the weight of the composition, of starch including the ungelatinized raw and gelatinized carrier portions of the starch,
   b) from about 0.3 to 5% by weight, based on the weight of the starch, of an alkali, and
   c) from about 40 to 90% by weight, based on the weight of the composition, of water, wherein the raw starch is a chemically treated or modified high amylose starch having at least 40% by weight amylose content.

15. The corrugating adhesive of claim 14 wherein the chemical treatment or modification of the high amylose raw starch component comprises oxidation, hydrolysis, esterification, etherification crosslinking, and alkali or solvent treatment.

16. The corrugating adhesive of claim 15 wherein the raw starch component comprises a high amylose starch oxidized by treatment with alkaline hypochlorite.

17. The corrugating adhesive of claim 16 wherein the raw starch comprises a blend containing 10% or more by weight of high amylose treated or modified starch with other starch materials.

18. The corrugating adhesive of claim 17 wherein the high amylose raw starch contains at least 50% by weight of amylose content.

* * * * *